(12) United States Patent
Saulnier et al.

(10) Patent No.: US 6,522,243 B1
(45) Date of Patent: Feb. 18, 2003

(54) GEOMETRIC HARMONIC MODULATION SIGNALING AND DETECTION

(75) Inventors: Gary Jude Saulnier, Rexford; Ralph Thomas Hoctor, Saratoga Springs; John Erik Hershey, Ballston Lake; Richard Charles Gaus, Jr., Burnt Hills, all of NY (US)

(73) Assignee: General Electric Company, Schenectady, NY (US)

( * ) Notice: Subject to any disclaimer, the term of this patent is extended or adjusted under 35 U.S.C. 154(b) by 17 days.

(21) Appl. No.: 09/892,358

(22) Filed: Jun. 28, 2001

(51) Int. Cl.[7] .................................................. H04M 11/04
(52) U.S. Cl. ........................ 340/310.01; 340/310.02; 340/310.06; 340/538; 340/870.02; 375/130
(58) Field of Search ..................... 340/310.01, 310.02, 340/310.03, 310.06, 310.07, 538, 870.02; 375/130, 210, 216, 346

(56) References Cited

U.S. PATENT DOCUMENTS

| | | | |
|---|---|---|---|
| 5,519,692 A | 5/1996 | Hershey et al. | 370/210 |
| 5,519,725 A | 5/1996 | Hershey et al. | 375/216 |
| 5,563,906 A | 10/1996 | Hershey et al. | 375/130 |
| 5,568,508 A | 10/1996 | Hershey | 375/130 |
| 5,708,966 A | 1/1998 | Al-Dhahir et al. | 455/13.4 |
| 5,844,949 A | 12/1998 | Hershey et al. | 375/346 |
| 5,897,607 A | 4/1999 | Jenney et al. | 702/62 |
| 5,903,594 A | 5/1999 | Saulnier et al. | 375/130 |
| 5,933,092 A | 8/1999 | Ouellette et al. | 340/870.02 |

OTHER PUBLICATIONS

One–Way Meter Unit by Unique Technology.
"Modest But Useful Erasure Technique for DPSK," JE Hershey; RT Hoctor; AA Hassan, Electronic Letters, vol. 33, No. 1, Jan. 2, 1997, pp. 21–22.
"GHM Aggregator,"CM Puckette et al., Ser. No. 09/476,821 (GE docket RD–26,517), filed Jan. 3, 2000.

*Primary Examiner*—Daryl Pope
(74) *Attorney, Agent, or Firm*—John F. Thompson; Jill M. Breedlove

(57) ABSTRACT

A communication system includes a transmitter configured to pulse shape a GHM signal to confine the frequency spectrum of the GHM signal within a predefined frequency range. A receiver is also included that receives the transmitted GHM signal. The receiver includes a processor for maximizing the GHM signal to noise ratio and minimizing the bit error rate. The GHM signals are also synchronized to establish a relative time for correct interpretation of bit positions.

15 Claims, 2 Drawing Sheets

US 6,522,243 B1

GEOMETRIC HARMONIC MODULATION SIGNALING AND DETECTION

BACKGROUND OF THE INVENTION

The present invention relates generally to a communication system and, more particularly, to a communication system for communicating information via a power distribution network.

Geometric harmonic modulation (GHM) allocates signaling energy into lobes, tones or different evenly spaced frequencies. The GHM tones have frequencies that are midway between a pair of adjacent power line harmonic frequencies. With the GHM tones midway between the harmonic frequencies, the harmonic center frequencies coincide with first nulls of the GHM tones and vice versa.

Typically, a fast Fourier transform (FFT) is used to channelize a received GHM signal into frequency bands with a 30 hertz (Hz) spacing. This bin spacing is obtained using a 1024 bin FFT with sampling rate of about 30720 Hz. The objective is to separate the GHM signal from the harmonics of 60 Hz that are present in the power line. By using a bin spacing of 30 Hz, these harmonics can theoretically be eliminated by discarding every other bin of the FFT. At the same time, the GHM carriers are selected to be mid-way between the harmonics of 60 Hz so that the harmonics can be removed and the GHM signal will remain. Also, the data rate is chosen to be 30 Hz so that each modulated GHM carrier can be represented by a signal bin of the FFT.

However, each bin of the FFT does not have an ideal bypass frequency response. Rather, an ideal bypass frequency can have a $$\frac{\sin \chi}{\chi}$$

response with nulls occurring at the other bin centers. Consequently, if the harmonics of the power line signal are exactly at multiples of 60 Hz and the sampling frequency is exactly 30720 Hz, the harmonics will have no effect on the frequency bins in which the GHM signal is located. However, in practice, noise and frequency variations on the power line prevent maintaining an ideally perfect frequency lock.

BRIEF SUMMARY OF THE INVENTION

In one exemplary embodiment of the present invention, a communication system comprises a transmitter that is configured to transmit a GHM signal. The transmitter is configured to pulse shape the GHM signal to confine the frequency spectrum of the GHM signal to within a predefined frequency range. A receiver is provided that receives the transmitted GHM signal. In another representative embodiment, the transmitter includes a root raised cosine filter that pulse shapes the GHM signal transmissions to have the same frequency response as a matched filter in the receiver. In even another representative embodiment of the present invention, the receiver comprises a processor that maximizes the signal to noise ratio and minimizes the bit error rate. The processor is configured to estimate the amplitude distortion resulting from transmission of the GHM signal on via a power line distribution system.

In yet another representative embodiment of the present invention, a method is provided for synchronization of GHM signals to establish relative times for the correct interpretation of bit positions. The method comprises the steps of transmitting signals from a transmitter to a receiver that is coupled to a power line. The signals are synchronized to establish a relative time for correct interpretation of the bit positions. A data frame is generated including a preamble configured with a Barker sequence. The data frame is transmitted from the transmitter to a power line. The receiver receives the transmitted data frame. The presence of the Barker sequence is detected in the transmitted data frame.

DETAILED DESCRIPTION OF THE INVENTION

Figure 1:
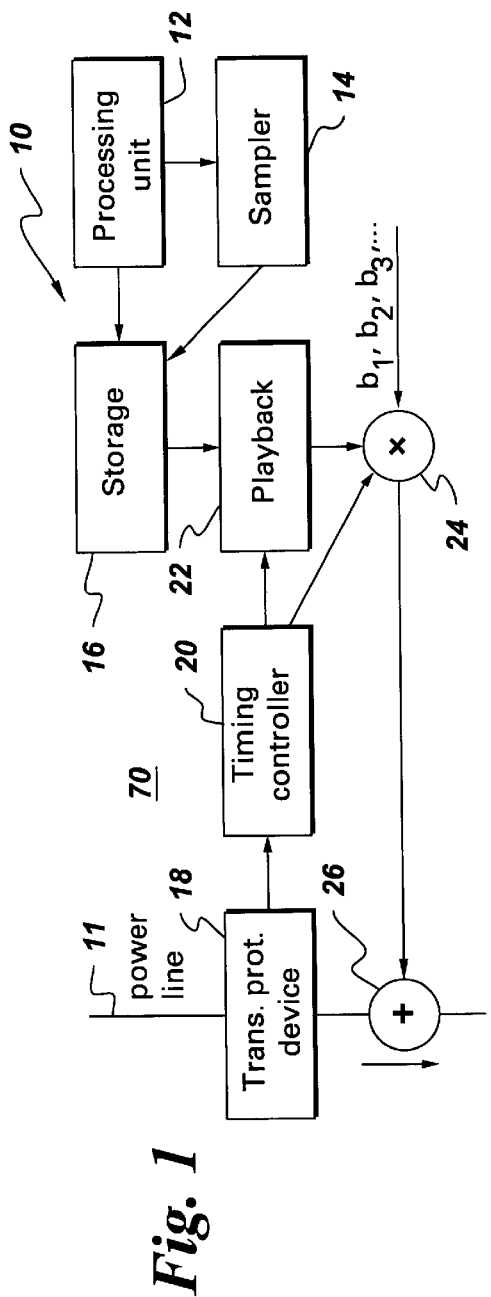
FIG. 1 is block diagram of one representative embodiment of a transmitter.

As shown in FIG. 1, a GHM communication system 70 includes a GHM transmitter 10 that is connected to a power line 11. In the transmitter 10, GHM carrier signals are synthesized together to form a single signal that has eight (8) carrier frequencies. The GHM carrier signals are synthesized using a processing unit 12, such as, for example, a general purpose computer, a microprocessor, a waveform creation device or a digital signal processor. The processing unit 12 is connected to a sampler 14 that samples the synthesized signal. A storage device 16 is connected to the sampler 14 and the processing unit 12, and the storage device 16 stores the sampled signals received from the sampler 14. In one embodiment, the storage device 16 comprises, for example, a non-volatile memory, a random access memory (RAM), a read-only memory (ROM), an erasable, programmable read-only memory (EPROM) or an electronic, erasable, programmable read-only memory (EEPROM). The GHM carrier signals are synthesized, sampled and stored before transmission using the power line 11.

A transient protection device 18 is connected to the power line 11 and a timing controller 20, and in one embodiment, the transient protection device 18 is connected in parallel across a distribution transformer (not shown). The transient protection device 18 limits power surges in order to protect equipment connected down line. In operation, the transient protection device 18 applies the power line voltage to the timing controller 20 that obtains timing information from the power line frequency to maintain a real time clock. In one embodiment, the power line frequency comprises a fundamental 60 Hz power line frequency. A playback device 22 is connected to the timing controller 20 and the storage device 16. At a predetermined time, the playback device 22 reads the samples from the storage device 16 at a rate synchronous with the power line voltage, for example, 60 Hz. In one embodiment, a system operator selects the predetermined time. A multiplier 24 is connected to timing controller 20 and the playback device 24 and multiplies the waveform created by the playback device 22 by a single bit (i.e., b1, b2, b3, . . . ) during each single bit period. The bit sequence from the playback device 22 is modified prior to transmission by the multiplier 24 by a change in bit values from a ones (1) and zeros (0) to a series of one (1) and negative one (−1) values. When the waveform from the playback device 22 is provided to the multiplier, a one (1) bit value will not change the waveform for a bit period, but a negative one (−1) bit value will invert the waveform. In one embodiment, a data source (not shown) supplies a series of bit (a1, a2, a3, . . . an) to a level shifter (not shown) that shifts the level of the supplied bits to a series of shifted bits (b1, b2, b3, . . . bn). The shifted bits (b1, b2, b3, . . . bn) are supplied to the multiplier 24.

Figure 2:
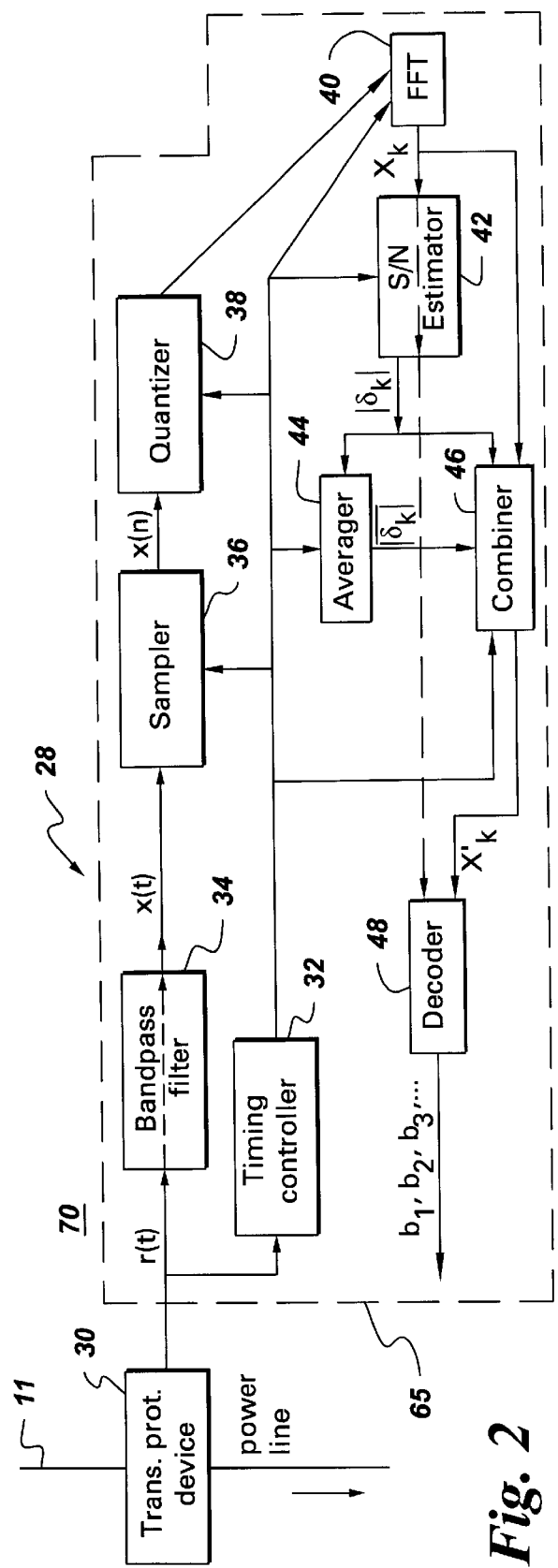
FIG. 2 is a block diagram of one representative embodiment of a receiver.

A summer 26 is connected to the power line 11 and the multiplier 24. The GHM modulated signal from the multiplier 24 is summed with the power signal from the power line 11 at summer 26, and the GHM modulated signal is transmitted over the power line 11 to a receiver 28 (FIG. 2). In one embodiment, the summer 26 comprises a current transformer that imposes the modulated GHM signal on the power line 11.

In FIG. 2, the GHM communication system 70 also includes a GHM receiver 28 that is connected to the power line 11 via a transient protection device 30 that limits power surges to protect equipment down line. The transient protection device 30 is connected to a timing controller 32 and a bandpass filter 34. The timing controller 32 monitors the power line voltage using signal r(t) passed from the transient protection device 30 to determine the power line frequency. In one embodiment, the power line frequency comprises a fundamental 60 Hz power line frequency. The timing controller 32 is also connected to and supplies a timing signal to a sampler 36, a quantizer 38, an averager 44, a combiner 46, a signal to noise (S/N) estimator 42 and a fast Fourier transform (FFT) module 40. The bandpass filter 34 removes noise from signal r(t) to produce signal x(t). It should be appreciated that in one embodiment the bandpass filter 34, sampler 36, quantizer 38, timing controller 32, FFT module 40, S/N estimator 42, averager 44, combiner 46 and decoder 48 comprise a receiver processor 65.

As disclosed above, the sampler 36 is clocked by the timing controller 32, the sampler 36 connected to the bandpass filter 34 to continuously sample signal x9t) to produce a series of discrete time samples {x(n)}. The sampler is connected to the quantizer 38 that receives the discrete samples {x(n)}, and the quantizer 38 reduces the precision of the sample to a set of $2^B$ values where B is the number of bit allocated per sample.

The quantizer 38 is connected to the FFT module 40 that receives the quantized samples {x(n)} and determines the inverse Fourier transform coefficients {$X_k(m)$} for signal x(n). The FFT module 40 is connected to a S/N estimator 42 that receives the Fourier coefficients {$X_k(m)$} and determines an estimated signal to noise (S/N) ratio for each of the Fourier coefficients {$X_k(m)$}. The S/N estimator 42 is connected to the averager 44 and the combiner 46. The averager 44 generates an averaged estimate of the S/N ratio by averaging the S/N ratios determined by the S/N estimator 42 over a predetermined number of symbols in a particular message or data packet. The combiner 46 receives the averaged S/N ratio and the Fourier coefficients and provides a weighting factor to the Fourier coefficients based upon the S/N ratio estimate for the frequency band. In one embodiment, the weighting is performed using, for example a thresholding technique by eliminating coefficients which do not meet a predetermined threshold. In another embodiment, other conventional weighting techniques can be utilized. A decoder 48 is connected to the combiner 46 and the weighted Fourier coefficients $X'_k$ are passed directly to the decoder 48 that recovers the message or data packet bits from the GHM signal.

Since the transmitted GHM carrier signal has a $$\frac{\sin \chi}{\chi}$$

frequency spectrum, the GHM receiver 28 comprises a matched filter receiver and provides optimal performance in additive white Gaussian noise (AWGN). Consequently, if the GHM receiver 28 is modified, the transmitted GHM carrier signal should also be modified to avoid or mitigate detection losses.

In another embodiment, pulse shaping is used in the GHM transmitter 10 to confine the frequency spectrum of the transmitted GHM signal. In a representative embodiment, a root raise cosine filter is used to pulse shape the transmitted GHM signal and the same frequency response is used as the matched filter in the GHM receiver 28. In another representative embodiment, a cascade of two filters produces an output waveform with no intersymbol interference (ISI), and the output has the same bit-error-rate (BER) performance as non-pulse shaped transmissions in AWGN. In even another representative embodiment, the transmitted GHM carrier signals are pulse shaped and the root cosine receiver filters are implemented using a modulated filter bank structure.

In one embodiment, a bank of bypass filters is formed from a lowpass filter with a root-raised-cosine frequency response by modulating the coefficients (i.e., the impulse response) by a complex exponential $e^{j2\pi f_i t}$ where $f_i$ is the center frequency of the particular bandpass filter.

Figure 3:
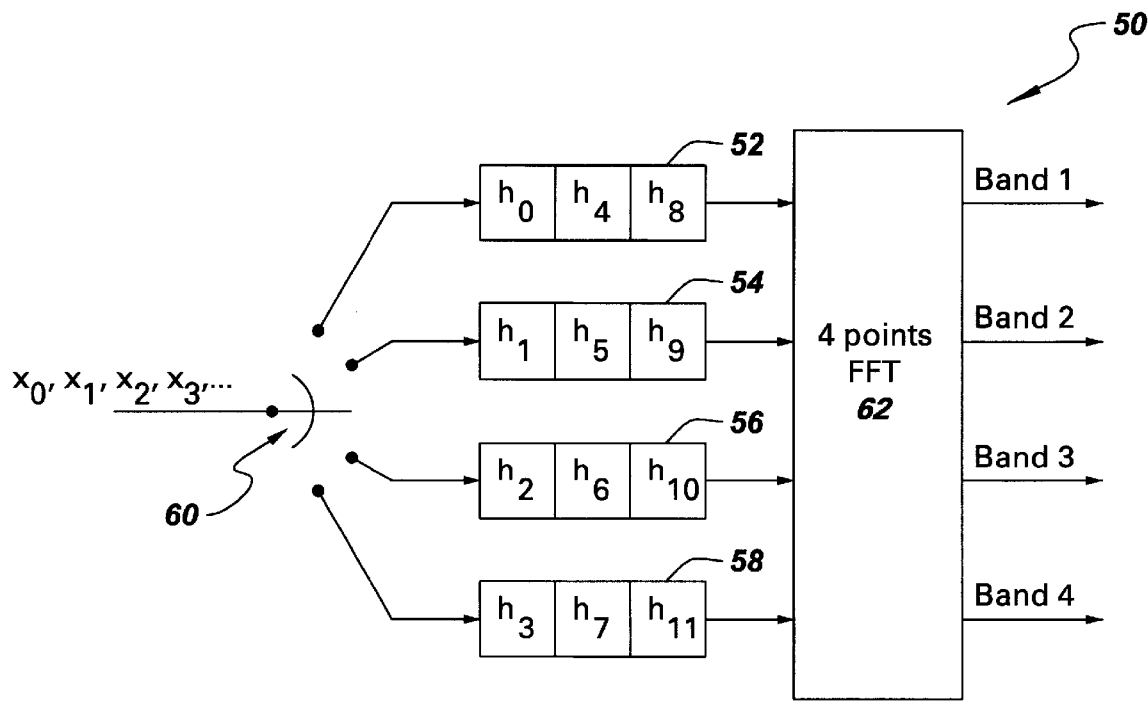
FIG. 3 is a block diagram of one representative embodiment of a finite impulse response (FIR) filter using a polyphase implementation.

In FIG. 3, a finite impulse response (FIR) filter bank 50 has tap weights ($h_1, h_2, h_3 \ldots h_{f1}$). In one embodiment, the FIR filter bank 50 is a low pass polyphase filter bank. Polyphase structures are known in the signal processing art for efficient realization of filter banks. In one embodiment, the bandwidth of the FIR filter bank 50 is lower than the sampling rate such that the filter output can be decimated by a factor of four (4) without introducing aliasing. As such, rather than a signal twelfth ($12^{th}$) order filter, the FIR filter bank 50 has four (4) third ($3^{rd}$) order filters 52, 54, 56 and 58. The input samples ($x_1, x_2, X_3$ and $x_4$) are sequentially supplied to the $3^{rd}$ order filters 52, 54, 56 and 58 via a commutator 60 introduces the decimation by four (4). In one embodiment, the commutator 60 comprises as serial to parallel converter. The outputs of the $3^{rd}$ order filters 52, 54, 56 and 58 are connected to and processed by a processor 62 using a four point fast Fourier transform (FFT). From the processor 62, four (4) outputs (Band 1, Band 2, Band 3 and Band 4) are generated. The output of the FIR filter bank 50 is the same as every $4^{th}$ output sample of the original filter. It should be appreciated that the FIR filter bank 50 can be included in transmitter 10 (FIG. 1) such that the GHM carrier signals are signal processed before transmission on the power line 11 (FIG. 1). In addition, it should also be appreciated that the FIR filter bank 50 can also be included in the receiver 28 (FIG. 2) such that the GHM signals receiver from the power line 11 can be filter into a frequency spectrum that is has a predetermined frequency range that is substantially similar to the predetermined frequency range of used by the transmitter 10 (FIG. 1).

Figure 4:
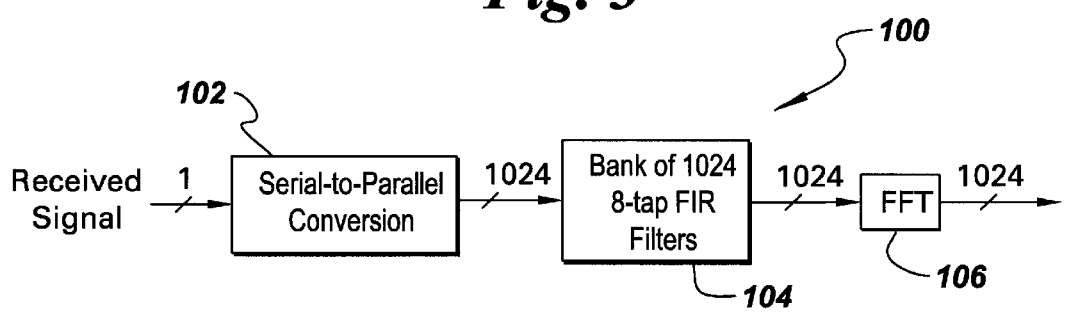
FIG. 4 is a block diagram of another representative embodiment of a receiver using a bank for FIR filters.

As shown in FIG. 4, another embodiment of a GHM receiver 100 comprises a serial-to-parallel converter 102 that receives a pulse shaped signal transmitted using a GHM transmitter 10 (FIG. 1) via a power line 11 (FIG. 1). The serial-to-parallel converter 102 is connected to a FIR filter bank 104. In one embodiment, the FIR filter bank 104 comprises low pass filters. In another embodiment, the FIR filter bank 104 comprises low pass filters that are root raised cosine filters, and the root raised cosine filters improve the spectral isolation between the bins. Typically, each bin collects four (4) 1024 samples, and in one embodiment where a root cosine filter is used, each bin collects 8 data bits for a total length of 8192 tap filters. It should be appreciated that the converters 102, the FIR filter bank 104 and FFT module 106 can be used in the receiver 28 (FIG. 2). In this embodiment, the converter 102 and the FIR filter bank 104 can be substituted for the filter 24 of FIG. 2, and the FFT module 106 can be substituted for the FFT module 40 of FIG. 2.

The converter 102 converts the received GHM signal into 1024 parallel outputs that are supplied to the FIR filter bank 104 that filters the 1024 parallel outputs. The FIR filter bank 104 is connected to a FFT module 106 that employs a 1024 point FFT to transform the filtered outputs.

In another embodiment, lost performance that results from differentially decoding GHM signals at the GHM receiver 28 can be recovered. In particular, the received GHM signal from the GHM transmitter 10 can be expressed a an N=1024 point vector:

$$g(k) = s(b_k, \underline{\theta}, \underline{\alpha}) + c_k + n_k \tag{1}$$

where s, $c_k$ and $n_k$ are all N-vectors representing the GHM signal components, the harmonic clutter components and the noise components, respectively. As such, the GHM signal can be characterized as:

$$s(b_k, \underline{\theta}, \underline{\alpha},) = \sum_{m=0}^{N-1} I_m b_k \alpha_m e^{j\theta_m} q_m \tag{2}$$

where $b_k$ assumes the values +1 and −1. The symbol $b_k$ represents the information but in the k-th symbol interval. The symbol $q_m$ represents the m-th DFT basis vector of dimension N=1024. The symbol $\underline{\theta}$ represents the vector of initial phase of the GHM components with m-th component $\theta_m$ and $I_m$ is the indicator function which is zero in case the m-th DFT bin does not represent a GHM tone and unity in case it does not represent a GHM tone. The complex-valued vector $\underline{\alpha}$ represents the distortion of the GHM components by the channel. The amplitude of the component $\alpha_m$ represents frequency selective fading for the m-th DFT frequency while it phase represents phase distortion (either a gross delay or a nonlinear phase response). The n-th DFT coefficient of the received waveform is:

$$G(n) = <g(k), q_n>$$

$$G(n) = I_n b_k \alpha_n e^{j\theta_n} + <c_k, q_n> + <n_k, q_n> \tag{3}$$

using Dirac notation for the inner product: $<a,b> = b^H a$. When the line frequency is exactly 60 Hz then $I_m <c_k, q> = 0$, since $c_k$ is the sum of $q_v$ corresponding to non-GHM components and is the orthogonal complement of the GHM signal space.

When the effect of the channel, as modeled by the vector $\underline{\alpha}$, is known, a detection statistic is formed by summing the phase-corrected and the amplitude-corrected DFT coefficients:

$$L = \sum_{m=0}^{N-1} G(n) I_m \alpha_m^* e^{-j\theta_m} \tag{4}$$

$$L = \sum_{n \text{ is in } GHM \text{ components}} |\alpha_m|^2 b_k + N_{k,n} \alpha_m^* e^{-j\theta_m}$$

where $N_{k,n}$ represents the noise in the n-th DFT bin during the k-th signal interval. Weighting the components of the sum by $\alpha_n$ is referred to as maximal ratio combining, and it is known to maximize the signal to noise ratio (SNR) of the statistic. The first line in Equation 4, shown above, is an inner product between the initial-phase-corrected GHM DFT coefficients of the received waveform and a frequency domain model of the distorted transmitted GHM waveform. The inner product implements a matched-filter correlation receiver in the frequency domain. The noise power in each of the DFT bins does not depend upon the amplitudes of $\alpha_m$ values but is the same for each bin. The noise in the detector is weighted by the $\alpha_m$ values.

Since the detection statistic of Equation 4 (shown above) maximizes the SNR, it will also minimize bit error rate, which is a function of SNR. The implementation of a GHM receiver 28 to maximize the SNR in accordance with Equation 4 uses a S/N estimator 42 that estimates both the amplitude and the phase distortion imparted by the channel. An estimation of the phase distortion using differential signaling results in a very high bit error probability. An estimation of the $\alpha_m$ values can be performed if a sequence of symbols in the transmitted bits, such as a training sequence or packet header, is known. The estimation of the $\alpha_m$ values can be determined by averaging the GHM DFT coefficients of the observed symbols, correcting for initial phase and the polarity of the transmitted bits and obtaining a frequency domain model of the transmitted signaling waveform as modified by the channel distortion. Thus, given $b_k$ for k=1,M, for the n-th DFT coefficient, corresponding to one of the GHM tones, an estimation $a_k$ of $\alpha_k$ can be expressed as:

$$a_k = \frac{1}{M} \sum_{k=1}^{M} G_k(n) b_k e^{j\theta_m} \tag{5}$$

where $G_k(n)$ is the n-th DFT coefficient during the k-th bit period. Equation (5) represents a time average of the phase-corrected DFT coefficients.

In an embodiment where no training sequence is available or if the training sequence has been used, a decision-directed adaptation can be use a current signal model to demodulate the current input waveform, and the result of the demodulation as the value of $b_k$ to adjust the signal model. In either case, the time constraints of the adaptive algorithm can be selected based upon how rapidly the channel characteristics vary. The approach shown in Equation 5 represents a frequency domain approach. In another embodiment, a time domain method can be used where a projection operation is the time domain yields an observed signal with the clutter filtered out. In addition, the noise in the orthogonal complement of the signal space can also be used. It will be appreciated that the frequency domain approach requires fewer multiplications.

In another embodiment, the GHM signals are synchronized to establish relative times for the correct interpretation of bit positions. Typically, synchronization algorithms consume overhead and are costly even if the synchronization algorithms use small percentage of the GHM channel capacity. A synchronization algorithm should provide acceptable results with regard to false synchronization (Type I error) and missed synchronization (Type II error). The probability of missed synchronization can be characterized as:

$$p_{misse\ synch} = p_{missed\ synch/synch\ attempted} \cdot p_{synch\ attempted} \quad (6)$$

Analytical attention is usually focused on the $p_{missed\ synch/synch\ attempted}$ portion of the equation for conditional probability. The probability of false synchronization is more subtle than missed synchronization. In one embodiment, the probability of success or failure of declaring a synchronization attempt at any particular epoch candidate can be determined. This approach does not identify how many epochs that need to be tested. To determine the number of epochs, measures of time (e.g., mean time to false synchronization or number of false synchronizations per year) are used. In addition, the signaling rate and consumer requirements can also be factored into the synchronization.

Figure 5:
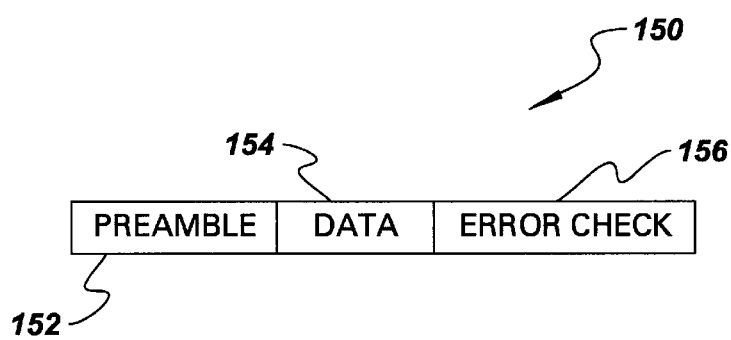
FIG. 5 is a block diagram of one representative embodiment of a data frame.

In one embodiment shown in FIG. 5, data transport can be achieved through the use of a data frame 150. The preamble field 152 is used for synchronization. Typically, the preamble field 152 contains an N-bit sequence that has special properties relating to autocorrelation. The data filed 154 has a fixed or known length, D-bits. The error check field 156 contains a cyclical redundancy code (CRC). The properties of the CRD are related to the length. In one embodiment, it is assumed that the CRC is computed over the data field 154 and detects an error in the data field 154 with a probability of $1-2^{-B}$ where B represents the number of bits allocated to the CRC. In another embodiment, the CRC can be viewed as passing a data frame 150 in error with a $2^{-B}$ probability.

The overhead consumed by the data frame 150 is $$\frac{(N+B)}{(N+B+D)}.$$

The protocol that accompanies the data frame 150 allows a retransmission of data frame 150 if the CRC indicates a transmission error. It should be appreciated that increasing the number of bits D in an attempt to reduce the overhead will increase the probability that a data frame 150 will have an error. The increased probability of an error by increasing the number of bits can have a detrimental effect if the data frame 150 must be retransmitted.

In another embodiment, a Barker sequence is sued in the preamble field 152 and the GHM receiver 28 (FIG. 2) can search for the Barker sequence. Specifically, each tone (i) that has a complex Fourier coefficient at discreet time (t) can be represented by $X_i(t) = x_i(t) + jy_i(t)$ and $S_i(t)$ can be represented by:

$$S_i(t) = \sum_{j=0}^{N-1} b_{N-j} X_i(t-j) \quad (7)$$

where $\overline{X}(t)$ is represented by:

$$\overline{X}_i(t) = \frac{1}{N} \sum_{j=0}^{N-1} X_i(t-j) \quad (8)$$

and where $\sigma_i^2(t)$ is represented by:

$$\sigma_i^2(t) = \frac{1}{N-1} \sum_{j=0}^{N-1} \|x_i(t-j) - \overline{X}_i(t)\|^2. \quad (9)$$

The division by N−1 is to debias the estimator of $\sigma_i^2(t)$. The statistic $\rho_i(t)$ is an easily computed and appropriate quantity for use in detecting the presence of the Barker sequence when aligned for maximum autocorrelation. Specifically, $\rho_i(t)$ can be referred to as:

$$\rho_i(t) = \frac{\|S_i(t)\|^2}{\sigma_i^2(t)}. \quad (10)$$

To incorporate information for all the times, the individual $\{\rho_i(t)\}$ are combined into the statistic $\rho(t)$ represented by:

$$P(t) = \sum_{i=1}^{N} \rho_i(t). \quad (11)$$

The statistic $\rho_i(t)$ is a measure of signal to noise in a tone. In addition, statistic $\rho_i(t)$ is the ratio of the mean square of the constellation spread to mean square constellation distance from zero. Also, statistic $\rho_i(t)$ is independent of frequency selective phase rotation if the phase rotation is considered as invariant over N consecutive symbols. Therefore, the statistic $\rho_i(t)$ achieves a highly desirable signal to noise ratio by maximal ratio combing in additive white Gaussian noise (AWGN).

In one embodiment, the synchronization can be adapted for non-AWGN interference modality by simply modifying the algorithm with a simple indicator function I(j,k) that excludes a sign bit from consideration in an attempt in an attempt to keep an impulse from corrupting the synchronization search. The indicator can be represented by:

$$I(j,k) = \begin{cases} 0, & j = k \\ 1, & j \neq k. \end{cases} \quad (12)$$

The indicator can be used to modify the calculation of the previously introduced quantites. For example, the mean $\overline{X}_i(t)$ can be represented by:

$$\overline{X}_i(t) = \frac{1}{N-1} \sum_{j=0}^{N-1} I(j,k) X_i(t) \quad (13)$$

or k=0, 1, . . . N−1. The indicator allows the number of tests to be expanded by N and the Type I/Type II error thresholds can be adjusted accordingly.

The foregoing discussion of the invention has been presented for purposes of illustration and description. Further, the description is not intended to limit the invention to the form disclosed herein. Consequently, variations and modifications commensurate with the above teachings and with the skill and knowledge of the relevant art are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A GHM communication system for communicating via a power line, the GHM communication system comprising:
   a GHM transmitter connected to the power line for transmitting a GHM signal via the power line, the GHM transmitter comprising:
      a processing unit connected to the power line for synthesizing a plurality of carrier frequencies to form the GHM signal; and
      a transmission filter bank connected to the processing unit for pulse shaping the GHM signal before transmission wherein the pulse shaped GHM signal is confined to a frequency spectrum having a predetermined frequency range;
   a GHM receiver connected to the power line for receiving the transmitted GHM signal, the GHM receiver comprising:
   a serial to parallel converter connected to the power line for converting the transmitted GHM signal into a plurality of outputs;
   a receiver filter bank connected to the plurality of outputs of the serial to parallel converter for filtering the plurality of outputs into a frequency spectrum substantially similar to said predetermined frequency range and the receiver filter bank for providing the plurality of outputs to a receiver filter bank output;
   an FFT unit connected to a receiver filter bank output for transforming the transmitted GHM signal received from the receiver filter bank output.

2. A GHM communication system for communicating via a power line, the GHM communication system comprising:
   a GHM transmitter connected to the power line for transmitting a GHM signal via the power line, said GHM transmitter comprising:
      at least one transmitter filter connected to the power line for pulse shaping the GHM signal before transmission wherein the pulse shaped GHM signal is confined to a frequency spectrum having a predetermined frequency range;
   a GHM receiver connected to the power line for receiving the transmitted GHM signal from the power line, said GHM receiver comprising:
      at least one receiver filter connected to the power line for filtering the transmitted GHM signal into a frequency spectrum substantially similar to said predetermined frequency range.

3. The GHM communication system of claim 1 wherein the at least one transmitter filter comprises a root based cosine filter and the at least one receiver filter comprises a root based cosine filter.

4. The GHM communication system of claim 1 wherein the GHM receiver further comprises:
   a serial-to-parallel converter connected to the power line for converting the transmitted GHM signal into a plurality of outputs, wherein the at least one receiver filter comprises a receiver filter bank and the plurality of outputs being connected to the receiver filter bank that filters the plurality of outputs and provides the plurality of outputs to a receiver filter bank output; and
   a FFT unit connected the receiver filter bank for transforming the transmitted GHM signal received from the receiver filter bank output.

5. The GHM communication system of claim 4 wherein the receiver filter bank comprises a plurality of FIR filters.

6. The GHM communication system of claim 5 wherein each of the plurality of FIR filters comprises an 8-tap filter.

7. The GHM communication system of claim 4 wherein said FFT unit comprises a 1024 point FFT algorithm.

8. The GHM communication system of claim 1 wherein said predetermined frequency range comprises about 30 Hz.

9. The GHM communication system of claim 8 wherein said predetermined frequency range comprises about 30 Hz.

10. The GHM communication system of claim 8 further comprising a first transient protection device connected between the power line and the GHM transmitter and a second transient protection device connected between the power line and the GHM receiver.

11. A GHM communication system for communicating via a power line, the GHM communication system comprising:
    a GHM transmitter connected to the power line for transmitting a GHM signal over the power line, the GHM transmitter comprising:
       a signal generator connected to the power line for generating the GHM signal, the GHM signal comprises a data frame including a preamble portion wherein the preamble portion comprises a Barker sequence;
    a GHM receiver connected to the power line for receiving the transmitted GHM signal transmitted over the power line, the GHM receiver comprising:
       a processor connected to the power line and receiving the transmitted GHM signal, the processor detecting the presence of the Barker sequence and estimating a channel distortion of the transmitted GHM signal using the Barker sequence.

12. The GHM communication system of claim 11 wherein the channel distortion comprises an amplitude distortion and a phase distortion of the GHM signal.

13. The GHM communication system of claim 11 wherein the processor further maximizes a signal to noise ratio of the GHM signal and minimizes a bit error rate of the GHM signal upon detection of the Barker sequence.

14. The GHM communication system of claim 11 wherein the processor estimates the channel distortion by averaging GHM DFT coefficients of the Barker sequence, correcting the GHM DFT coefficients for an initial phase and polarity of the Barker sequence and generating a frequency domain model of the GHM signal using the corrected GHM DFT coefficients to account for the channel distortion.

15. A GHM communication system for communicating via a power line, the GHM communication system comprising:
    a GHM transmitter connected to the power line for transmitting a GHM signal over the power line; and
    a GHM receiver connected to the power line for receiving the transmitted GHM signal transmitted over the power line, the GHM receiver comprising:
       a processor connected to the power line and receiving the transmitted GHM signal, the processor using a first signal model to demodulate the GHM signal and adjusting the first signal model using results of the demodulation of the GHM signal to produce a second signal model wherein the second signal model is used to demodulate subsequent GHM signal transmitted from the GHM transmitter over the power line.

* * * * *